Figure 5:
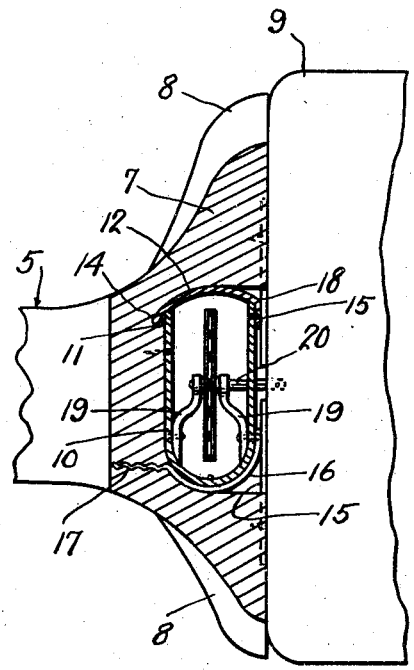

May 20, 1930.  J. HLAVACEK  1,759,698
AEROPLANE
Filed April 30, 1929    6 Sheets-Sheet 1
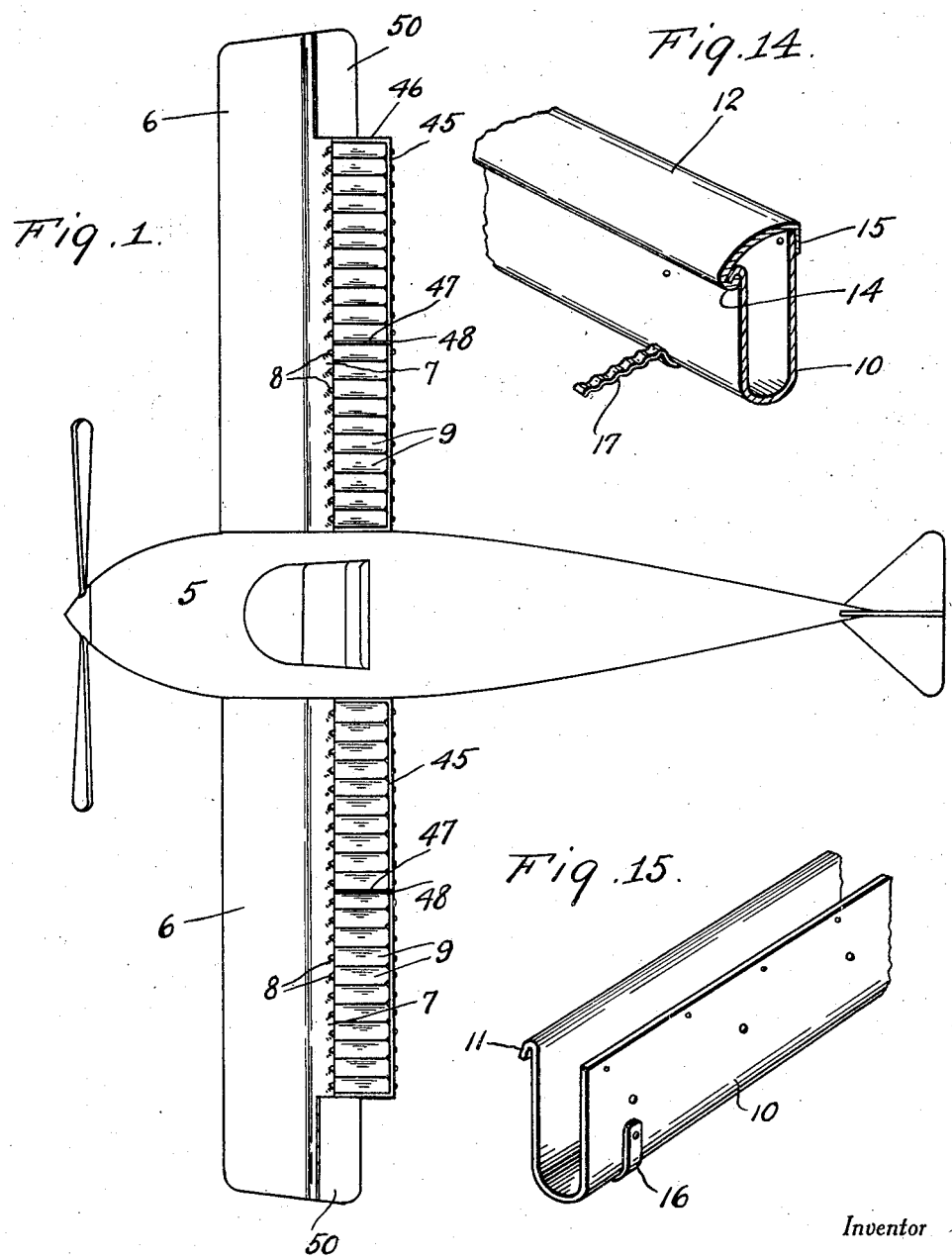
Inventor
Jan Hlavacek
By Clarence A. O'Brien
Attorney

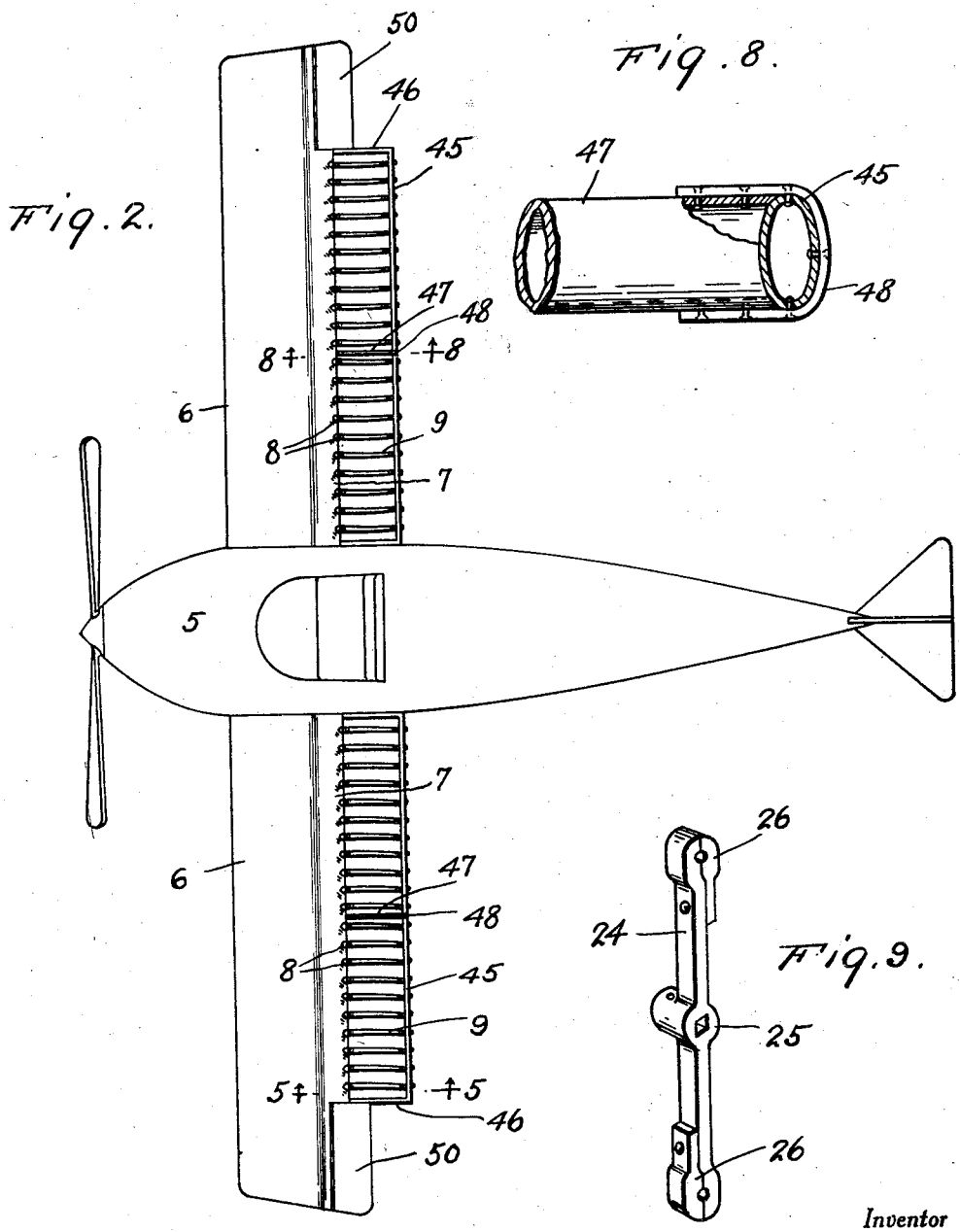

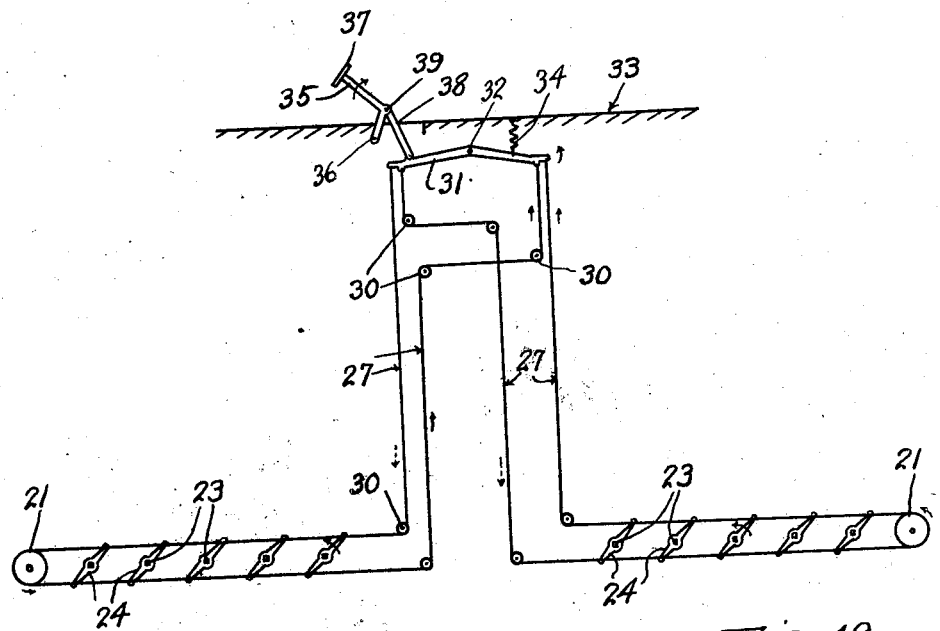
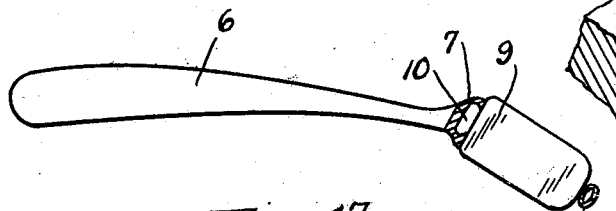
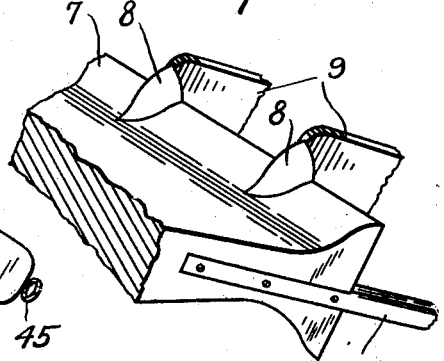
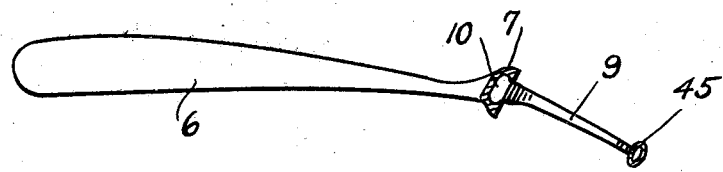
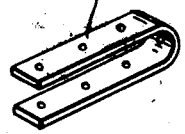

May 20, 1930.  J. HLAVACEK  1,759,698
AEROPLANE
Filed April 30, 1929    6 Sheets-Sheet 4

Inventor
Jan Hlavacek

By *Clarence A. O'Brien*
Attorney

May 20, 1930. J. HLAVACEK 1,759,698
AEROPLANE
Filed April 30, 1929 6 Sheets-Sheet 5
Fig. 10
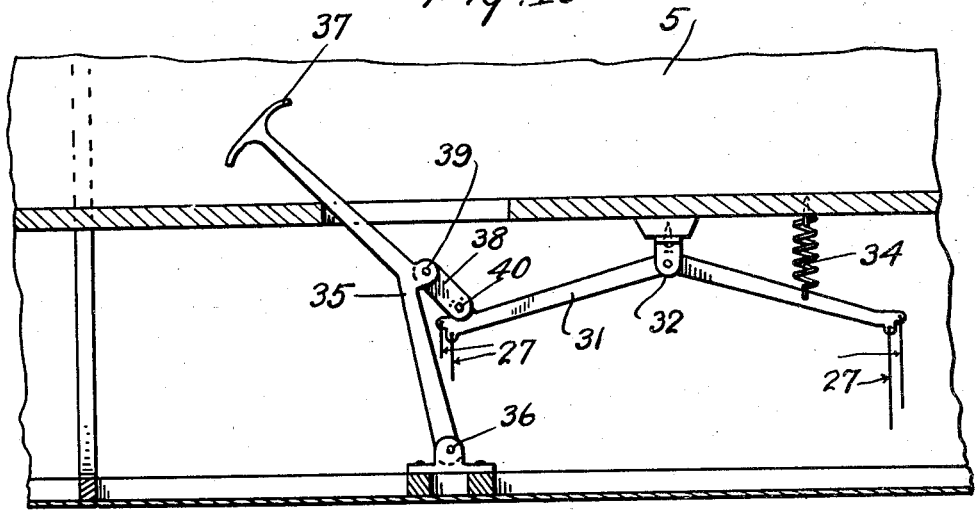
Fig. 11.
Fig. 12.
Fig. 13.
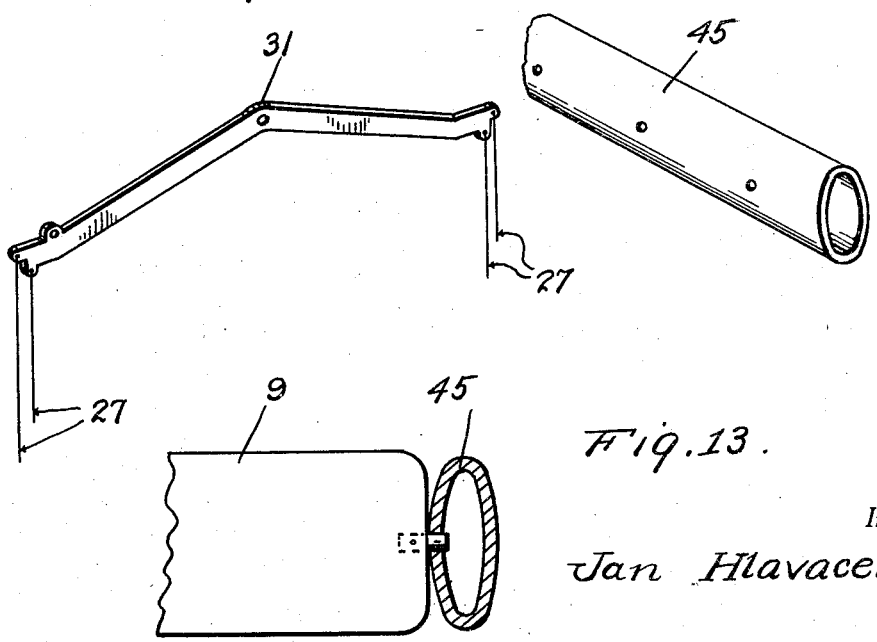
Inventor
Jan Hlavacek
By Clarence A. O'Brien
Attorney

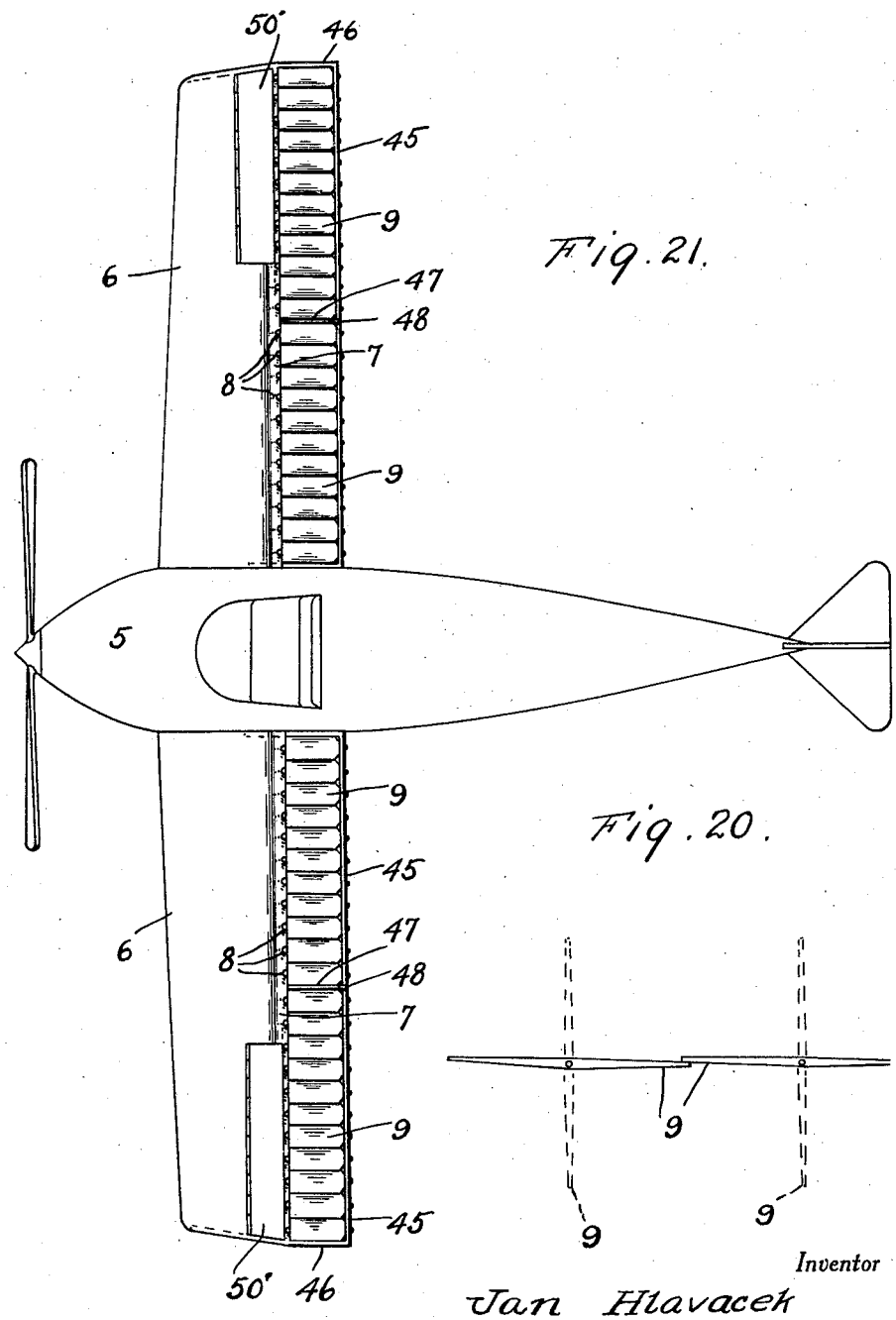

Patented May 20, 1930

1,759,698

UNITED STATES PATENT OFFICE

JAN HLAVACEK, OF CHICAGO, ILLINOIS

AEROPLANE

Application filed April 30, 1929. Serial No. 359,295.

The present invention relates to aeroplanes and has for its prime object to provide improved wing structures having means incorporated therein whereby the area of the wing surface may be increased or decreased as may be desired under different maneuvers.

Another very important object of the invention resides in the provision of a shutter like arrangement on the rear edge of the wing of an aeroplane with means associated therewith for opening and closing the shutter structure to increase or decrease the wing surface.

Thus in landing, making quick take offs, climbing quickly, and other similar maneuvers, the shutter like structure may be closed to afford a greater wing surface whereas in straight ahead level flying and other ordinary maneuvers, the shutter like structure may be kept closed.

Another very important object of the invention resides in the provision of an improved structure of this nature which is controllable by the foot of the aviator in the cockpit.

A still further very important object of the invention resides in the provision of improved structure of this nature which is simple, easy to manipulate, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
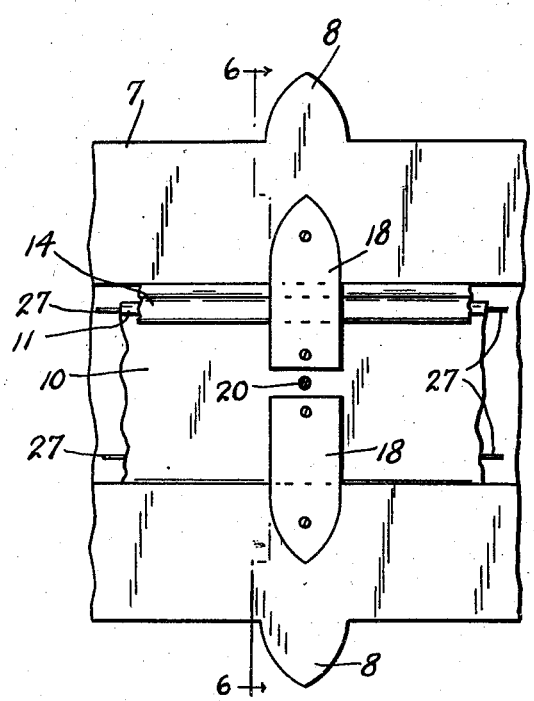
Figure 6:
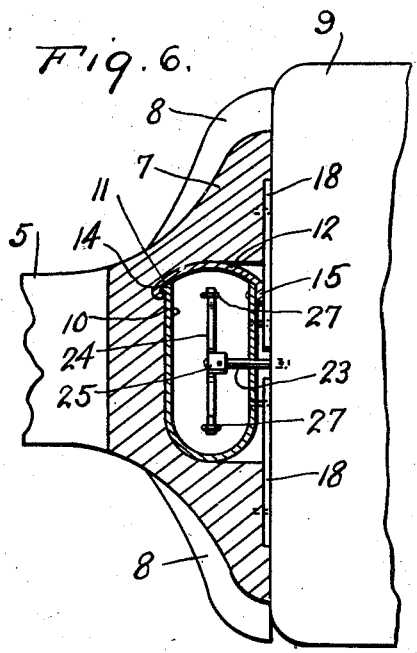
Figure 7:
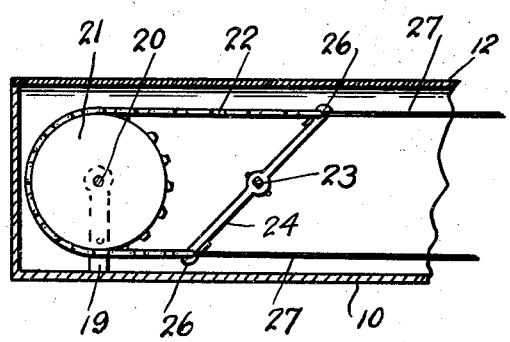

In the drawings:

Figure 1 is a top plan view of an aeroplane embodying the features of my invention, showing the shutter like structure closed, Figure 2 is a similar view showing the structure open, Figure 3 is a diagrammatic view illustrating particularly the operating mechanism for the shutter like structure, Figure 4 is a fragmentary large detail rear elevation of a wing, Figure 5 is an enlarged detail section taken substantially on the line 5—5 of Figure 2, Figure 6 is a sectional view taken substantially on the line 6—6 of Figure 4, Figure 7 is a fragmentary sectional view showing one end of the casing and the rear edge of one of the wings, Figure 8 is an enlarged detail sectional view taken substantially on the line 8—8 of Figure 2, Figure 9 is a perspective view of one of the frames, Figure 10 is an enlarged detailed longitudinal vertical section through the bottom of the cockpit of the fuselage showing the foot control operating mechanism, Figure 11 is a perspective view of the lever thereof, Figure 12 is a fragmentary perspective view of one of the rear frame bars, Figure 13 is a sectional view therethrough showing one of the shutter pins pivotally engaged therein, Figure 14 is a fragmentary perspective view of the casing, Figure 15 is a fragmentary perspective view of one portion of the casing, Figure 16 is an end elevation of one of the wings showing the rear portion in section with the shutter mechanism in an open position, Figure 17 is a similar view with the shutter mechanism in a closed position, Figure 18 is a perspective view of a trap for engaging the braces with the rear frame bar, Figure 19 is a fragmentary perspective view of the rear edge of one of the wings, Figure 20 is a detail view of two of the shutter pins showing the same in overlapping closed relationship, and Figure 21 is a top plan view showing another embodiment of the invention.

Referring to the drawing in detail it will be seen that the numeral 5 denotes a fuselage with wings 6 extending laterally therefrom in the usual well known manner. The rear edges of the wings are enlarged in thickness as is indicated at 7 and have a plurality of fins 8 projecting therefrom one for each shutter fin 9. In the rear edge 7 which is hollowed out there is mounted a casing 10 of U-shaped formation in cross section and having a depending outward flange 11 on one edge.

A curved top 12 has a flange of curved construction as at 14 to engage under the flange 11 and another flange 15 at the other end thereof to be bolted or otherwise secured to the other edge of the casing 10. A plurality of straps 16 are secured to the bottom portion of the casing and having continuous extensions 17 to be driven into the edge 7 as is clearly illustrated in Figure 5.

Plates 18 are secured to the rear faces of the edges to extend over the rear of the casing and are fastened thereto in any suitable manner.

Brackets 19 in the outer end of each casing have a shaft 20 journaled therein with a sprocket 21 fixed thereto over which is trained a chain section 22. The shaft 20 is journaled through the rear wall of the casing 10. Other shafts 23 are journaled through the rear wall of the casing and on their inner ends have cranks 24 with center hubs 25 fixed to the shaft while the ends are provided with clamp structures 26 for engaging wires 27 fixed to the chain segments 22.

On the rear portions of the shafts 20 and 23 are mounted the shutter like fins 9. These wires 27 are trained over a plurality of pulleys 30 and attached to ends of rockers 31.

This rocker 31 is pivoted intermediate its ends in a bracket 32 extending from the floor 33 of the cockpit of the fuselage 5 and a spring 34 is engaged with one arm of the rocker 31 and with the bottom of the floor 33 to hold the rocker in a normal position with the shutters or shutter like fins open that is in vertical planes.

A foot lever 35 is pivoted as at 36 and has a foot piece 37 at its upper end. A link 38 is pivotally engaged as at 39 with its intermediate portion of the lever 35 and as at 40 with the other end or rather the extremity of the other arm of the rocker 31.

Obviously by pressing on the foot lever so as to swing in a clockwise direction in Figure 10 or referring to Figure 3 for better illustration it will be seen that the rocker 31 will be rocked to pull the wires and cause the closing of the shutter like fins.

Frame bars are denoted by numerals 45 and have the rear ends of the fins 9 rockable therein and at their ends are provided with forward extensions 46 fixed to the wings. These frame bars 49 are braced by braces 47 secured to the wings and secured to the frame bars by U-shaped straps 48 as is clearly illustrated in Figure 8.

It will be noted that the frame bars and the braces are oval in cross section. In the embodiment just described and shown assembled in Figures 1 and 2 it will be seen that the shutter like structure terminates to the inner side of ailerons 50 but in the embodiment of the invention disclosed at 21 the shutter like structures extend to the ends of the wings and ailerons 50' are located forwardly thereof.

When the shutter like fins are closed that is substantially horizontally disposed they overlap each other as is clearly shown in Figure 20.

From the above detailed description it is thought that the construction, operation, utility and advantages of my invention now is clearly understood without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, an aeroplane wing having an enlarged rear end with a recess therein, a casing in the recess, a plurality of shafts journaled through the casing, means for simultaneously rocking the shafts, shutter fins on the shaft exteriorly of and to the rear of the casing.

2. In combination, an aeroplane wing having an enlarged rear end with a recess therein, a casing in the recess, a plurality of shafts journaled through the casing, means for simultaneously rocking the shafts, shutter fins on the shaft exteriorly of and to the rear of the casing, a frame structure mounted on the wings in which the rear end of the fins are journaled.

3. In combination, an aeroplane wing having an enlarged rear end with a recess therein, a casing in the recess, a plurality of shafts journaled through the casing, means for simultaneously rocking the shafts, shutter fins on the shaft exteriorly of and to the rear of the casing, a frame structure mounted on the wings in which the rear end of the fins are journaled, said casing comprising a bottom portion of U-shaped sectional formation, a top for said bottom portion, interlocking flanges on the top and bottom of the casing and a bolted flange on the top of the casing to engage the casing.

4. In combination, an aeroplane wing having an enlarged rear end with a recess therein, a casing in the recess, a plurality of shafts journaled through the casing, means for simultaneously rocking the shafts, shutter fins on the shaft exteriorly of and to the rear of the casing, a frame structure mounted on the wings in which the rear end of the fins are journaled, the rear edge of the wing being formed with fins, a pair for each shutter.

In testimony whereof I affix my signature.

JAN HLAVACEK.